(12) United States Patent
Li

(10) Patent No.: US 10,887,343 B2
(45) Date of Patent: Jan. 5, 2021

(54) PROCESSING METHOD FOR PREVENTING COPY ATTACK, AND SERVER AND CLIENT

(71) Applicant: Advanced New Technologies Co., Ltd., George Town (KY)

(72) Inventor: Xiaofeng Li, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/722,832

(22) Filed: Dec. 20, 2019

(65) Prior Publication Data
US 2020/0128045 A1 Apr. 23, 2020

Related U.S. Application Data

(63) Continuation of application No. 16/186,197, filed on Nov. 9, 2018, which is a continuation of application No. PCT/CN2017/080006, filed on Apr. 11, 2017.

(30) Foreign Application Priority Data

May 13, 2016 (CN) .......................... 2016 1 0318168

(51) Int. Cl.
H04L 29/06 (2006.01)
G06F 21/55 (2013.01)
G06F 12/14 (2006.01)

(52) U.S. Cl.
CPC ...... H04L 63/1475 (2013.01); G06F 12/1458 (2013.01); G06F 21/55 (2013.01);
(Continued)

(58) Field of Classification Search
USPC .......... 726/23, 2, 21, 36; 713/150, 163, 181; 380/255, 264, 276
See application file for complete search history.

(56) References Cited

U.S. PATENT DOCUMENTS

2007/0245010 A1* 10/2007 Arn ..................... H04L 67/1023
709/223
2011/0072260 A1* 3/2011 Koo ................... H04N 21/6334
713/156
(Continued)

FOREIGN PATENT DOCUMENTS

CN 1902694 1/2007
CN 1957356 5/2007
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

Primary Examiner — Sharif E Ullah
(74) Attorney, Agent, or Firm — Fish & Richardson P.C.

(57) ABSTRACT

Service data is received by a server and from a client computing device, where the service data includes a unique identifier and a variable identifier stored in a local secure storage of the client computing device. The server parses the service data to obtain the unique identifier and the variable identifier as parsed data. The server determines whether the unique identifier and the variable identifier in the parsed data are identical to a unique identifier and a variable identifier associated with the client computing device and recorded by the server as recorded data. If the result of the determination is not identical, the server indicates that the local secure storage of the client computing device is under a copy attack, and performing a predetermined response action. If the result of the determination is identical, the server transmits a new variable identifier to the client computing device.

20 Claims, 9 Drawing Sheets

(52) U.S. Cl.
CPC .......... *H04L 63/0428* (2013.01); *H04L 63/08* (2013.01); *H04L 67/42* (2013.01); *G06F 2212/1052* (2013.01); *G06F 2212/154* (2013.01)

(56) References Cited

U.S. PATENT DOCUMENTS

| | | | | |
|---|---|---|---|---|
| 2013/0204935 A1* | 8/2013 | Lunde | ................. | H04L 67/42 709/204 |
| 2015/0373510 A1* | 12/2015 | Stojanovski | .......... | H04W 16/14 370/312 |
| 2019/0081979 A1* | 3/2019 | Li | ................. | G06F 21/44 |

FOREIGN PATENT DOCUMENTS

| | | |
|---|---|---|
| CN | 101094383 | 12/2007 |
| CN | 101166091 | 4/2008 |
| CN | 104301288 | 1/2015 |
| CN | 104331801 | 2/2015 |
| CN | 104579694 | 4/2015 |
| CN | 105491077 | 4/2016 |
| TW | 201535287 | 9/2015 |
| TW | 201539239 | 10/2015 |

OTHER PUBLICATIONS

European Extended Search Report in European Application No. 17795368.4, dated Mar. 20, 2019, 8 pages.

International Search Report by the International Searching Authority issued in International Application No. PCT/CN2017/080006 dated Jul. 10, 2017; 9 pages.

Menezes [online], "Handbook of Applied Cryptography; Chapter 10," 1996, CRC Press, [retrieved on Sep. 7, 2018], retrieved from: URL<http://cacr.uwaterloo.ca/hac/about/chap10.pdf, 41 pages.

Nakamoto, "Bitcoin: A Peer-to-Peer Electronic Cash System," www.bitcoin.org, 2005, 9 pages.

PCT International Preliminary Report on Patentability in International Application No. PCT/CN2017/080006, dated Nov. 13, 2018, 10 pages (with English translation).

* cited by examiner

PROCESSING METHOD FOR PREVENTING COPY ATTACK, AND SERVER AND CLIENT

CROSS-REFERENCE TO RELATED APPLICATIONS

This application is a continuation of U.S. application Ser. No. 16/186,197, filed on Nov. 9, 2018, which is a continuation of PCT Application No. PCT/CN2017/080006, filed on Apr. 11, 2017, which claims priority to Chinese Patent Application No. 201610318168.6, filed on May 13, 2016, and each application is hereby incorporated by reference in its entirety.

TECHNICAL FIELD

The present application relates to the field of security authentication information data processing technologies, and in particular, to a processing method for preventing a copy attack, a server, and a client.

BACKGROUND

The rapid development of the Internet and information technologies increases dependence on mobile devices such as a mobile phone and a tablet in daily life. An application (APP) related to user property is usually installed on a mobile device of the user, for example, a mobile wallet, a mobile bank, an investment application, or a financial management application. How to protect a user terminal device from a hacker attack, avoid a user property loss, and effectively improve user property security has become an important subject of current terminal information security.

Currently, the APP of the mobile device usually uses soft secure storage for secure data storage. The soft security storage generally means that an anti-cracking method is added to software running on a device system such as an APP running on ANDROID, to provide security for local secure data storage. Usually, it is difficult for hacker to crack data and algorithms stored in the software. However, currently, hacker can easily figure out a copy attack method. To be specific, a hacker copies data and a user environment, and can directly simulate user equipment. As a result, the hacker can easily counterfeit the user by using the user data in the device to steal user information. The hacker can directly run a user account on a machine through copy attack, instead of forcefully cracking the data and algorithm in the software. Existing methods for preventing a copy attack are generally to bind with user equipment information. If it is determined that a device is not the previously bound device, the device is considered to be insecure. The existing methods can be easily cracked by hackers because device environment information is obtained by using an API of the system. A hacker can invoke the API of the system by using a more accurate algorithm through a hook to obtain the device environment information, and simulate the device information by using the API, to make the software misrecognize the device as the previously bound device, thereby cracking device binding protection and entering the user account.

Therefore, in the existing technology, simply perform soft secure storage of data on a client is still relatively insecure, and it is difficult to prevent a copy attack. In addition, device information bound to a user is usually inherent; therefore, once an attacker (such as a hacker) successfully launches a copy attack, the user can suffer from an inestimable loss.

SUMMARY

The present application aims to provide a processing method for preventing a copy attack, a server, and a client, to increase difficulty in launching a copy attack, reduce harm of implementing a copy attack, improve security of data storage applied in a terminal device, reduce a user property loss, and protect user property security.

The processing method for preventing a copy attack, the server, and the client provided in the present application are implemented as follows:

A processing method for preventing a copy attack includes: sending, by a client, service data to a server, where the service data includes a unique identifier and a variable identifier in local secure storage of the client that are sent by the server to the client; parsing out, by the server, the unique identifier and the variable identifier in the service data sent by the client, and determining, through comparison, whether the parsed-out unique identifier and variable identifier are the same as a unique identifier and a variable identifier that are recorded by the server for the client; if a comparison result is no, determining, by the server, that the local secure storage of the client is under a copy attack, and performing a predetermined response action; or if a comparison result is yes, sending, by the server, a new variable identifier to the client; and updating, by the client, the received new variable identifier to the local secure storage.

A processing method for preventing a copy attack includes the following: receiving service data sent by a client, where the service data includes a unique identifier and a variable identifier in local secure storage of the client that are sent by a server to the client; parsing out the unique identifier and the variable identifier in the service data sent by the client, and determining, through comparison, whether the parsed-out unique identifier and variable identifier are the same as a recorded unique identifier and variable identifier of the client; and if a comparison result is no, determining that local secure storage of the client is under a copy attack, and performing a predetermined response action; or if a comparison result is yes, sending a new variable identifier to the client.

A processing method for preventing a copy attack includes the following: when local secure storage is initialized, storing a unique identifier and a variable identifier that are sent by a server; sending service data to the server, where the service data includes the unique identifier and the variable identifier in the local secure storage; receiving a new variable identifier sent by the server, where the new variable identifier is a variable identifier sent by the server when the server determines through comparison that the unique identifier and the variable identifier that are uploaded by a client are the same as a unique identifier and a variable identifier that are recorded by the server for the client; and updating the received new variable identifier to the local secure storage.

A server for preventing a copy attack includes: a data receiving module, configured to receive service data sent by a client, where the service data includes a unique identifier and a variable identifier in local secure storage of the client that are sent by the server to the client; a comparison module, configured to parse out the unique identifier and the variable identifier in the service data sent by the client, and determine, through comparison, whether the parsed-out unique identifier and variable identifier are the same as a recorded unique identifier and variable identifier of the client; and a processing module, configured to determine that the local secure storage of the client is under a copy attack, and perform a predetermined response action, if a comparison result of the comparison module is no; or if a comparison result of the comparison module is yes, send a new variable identifier to the client.

A client for preventing a copy attack includes: a secure storage module, configured to store a unique identifier and a variable identifier that are sent by a server, when local secure storage is initialized; a data sending module, configured to send service data to the server, where the service data includes the unique identifier and the variable identifier that are stored in the secure storage module; a first receiving module, configured to receive a new variable identifier sent by the server, where the new variable identifier is a variable identifier sent by the server when the server determines through comparison that the unique identifier and the variable identifier that are uploaded by the client are the same as a unique identifier and a variable identifier that are recorded by the server for the client; and an updating module, configured to update the received new variable identifier to the local secure storage.

The processing method for preventing a copy attack, the server, and the client provided in the present application can be used to prevent an attacker from launching a copy attack on conventional device binding. In addition, a remote server is further used for determining whether the local secure storage applied in the client is under a copy attack. In practice, the attacker obtains device data, deploys an environment, and launches an attack. These actions usually lag behind an action of reusing a terminal application by the user. In the implementations provided in the present application, time validity of stored data is set to ensure that information data stolen through a copy attack by the attacker easily expires. In addition, the server determines whether a copy attack is launched. Considering that data storage security and data computing security of the server usually have a higher priority than those of the client, it is difficult for the attacker to bypass authentication protection of the server. As such, difficulty in launching a copy attack can be increased, overall harm of implementing a copy attack can be reduced, security of data storage applied in a terminal device can be improved, a user property loss can be reduced, and user property security can be protected.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art can still derive other drawings based on these accompanying drawings without creative efforts.

DESCRIPTION OF IMPLEMENTATIONS

To make a person skilled in the art better understand the technical solutions in the present application, the following clearly and comprehensively describes the technical solutions in the implementations of the present application with reference to the accompanying drawings in the implementations of the present application. Apparently, the described implementations are merely some but not all of the implementations of the present application. Other implementations obtained by a person of ordinary skill in the art based on the implementations of the present application without creative efforts shall fall within the protection scope of the present application.

Figure 1:
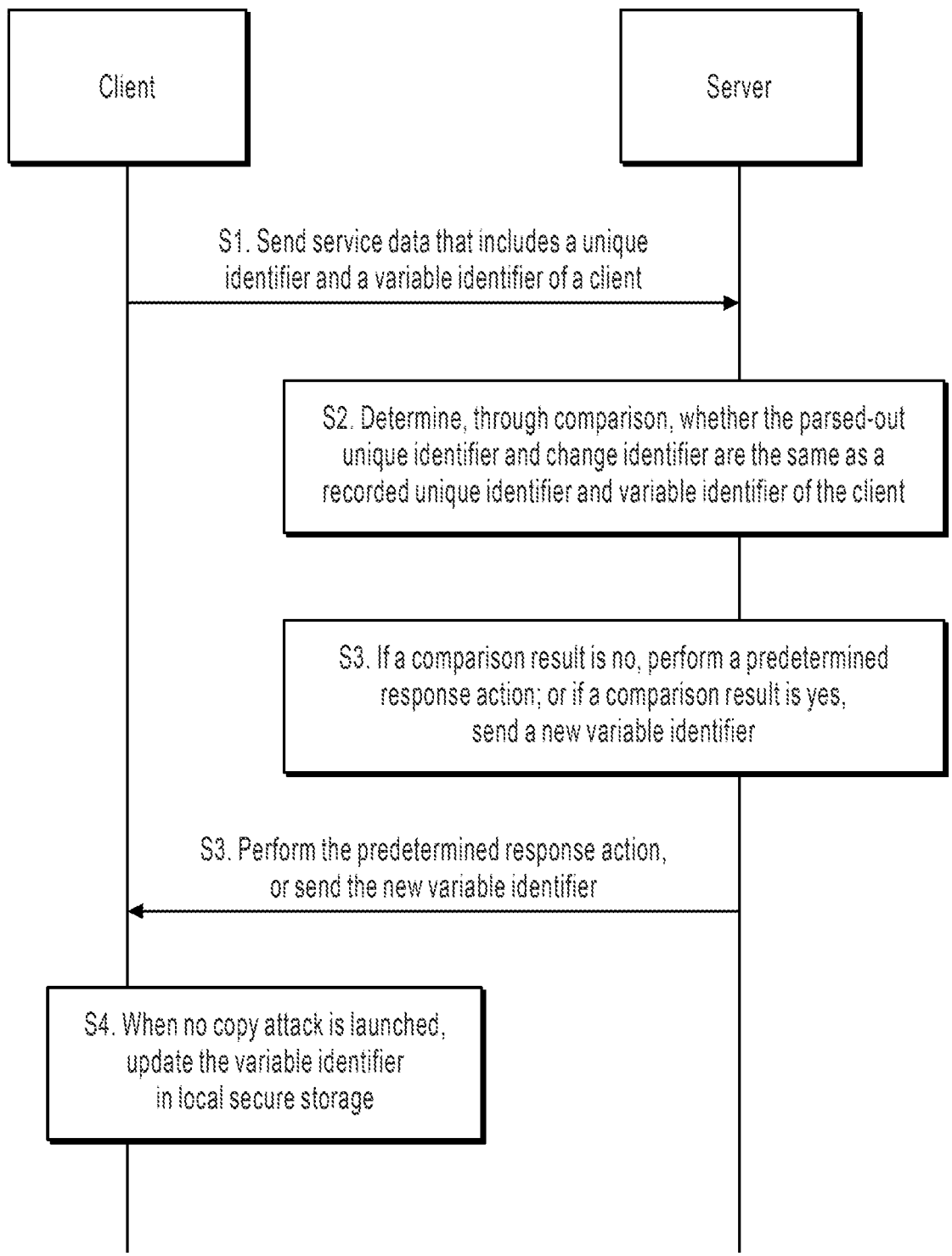
FIG. 1 is a method flowchart illustrating a processing method for preventing a copy attack, according to an implementation of the present application.

FIG. 1 is a method flowchart illustrating a processing method for preventing a copy attack, according to an implementation of the present application. Although the present application provides operation steps of a method or a structure of an apparatus shown in the following implementations or the accompanying drawings, the method or the apparatus can include more operation steps or module units, or fewer operation steps or module structures based on conventional or non-creative efforts. For steps or structures without necessary logical causal relationship, an execution sequence of the steps or a module structure of the apparatus is not limited to an execution sequence or a module structure provided in the implementations of the present application. When the method or the module structure is applied in an actual apparatus or an actual terminal product, the method or the module structure can be executed based on the sequence of the method or the module structure in the implementations or the accompanying drawings, or can be executed in parallel (for example, an environment of parallel processors, multithreaded processing, or even distributed processing).

As shown in FIG. 1, a processing method for preventing a copy attack according to an implementation of the present application can include the following steps.

S1. A client sends service data to a server, where the service data includes a unique identifier and a variable identifier in local secure storage of the client that are sent by the server to the client.

When the client exchanges information with the server and sends the service data to the server, the client can simultaneously send the unique identifier and the variable identifier in the local secure storage of the client to the server. The local secure storage of the client can include soft secure storage of an application in the client. Generally, when local secure storage is initialized in an application installed in the client, the client can apply to the server for a unique identifier used to identify the client and a variable random code for the initialization. The unique identifier is usually used to identify an identity of the client. Generally, when it is determined that the client is not under a copy attack, the unique identifier can not to change, and the variable random code can be set to be updated each time the client is triggered to use a service related to the local secure storage. Data formats of the unique identifier and the variable random code in the present application can be designed based on an actual application scenario. For example, the unique identifier in the present implementation can include a unique ID evolving from device information of the client. The variable identifier can be a random number that is randomly generated by the server each time, for example, a six-digit combination of numerals, letters, or symbols.

In another implementation of the method in the present application, encryption processing can be performed on the unique identifier and the variable identifier that are sent by the client to the server, to further improve data storage security, and increase difficulty in data cracking. For example, a data communication process can use RSA asymmetric encryption, AES symmetric encryption, etc. that includes a public key and a private key. Certainly, symmetric or asymmetric encryption can be performed on the unique identifier or the variable identifier that is delivered by the server to the client, to improve security of communication between the client and the server. Therefore, in another implementation of the processing method for preventing a copy attack in the present application, information exchange of the unique identifier and the variable identifier between the client and the server can be implemented by using any encryption method of asymmetric encryption or symmetric encryption.

Certainly, when receiving the unique identifier or the variable identifier sent by the server, the client can perform decoding by using a corresponding decryption algorithm, and store the obtained unique identifier or the obtained variable identifier in the local secure storage.

Figure 2:
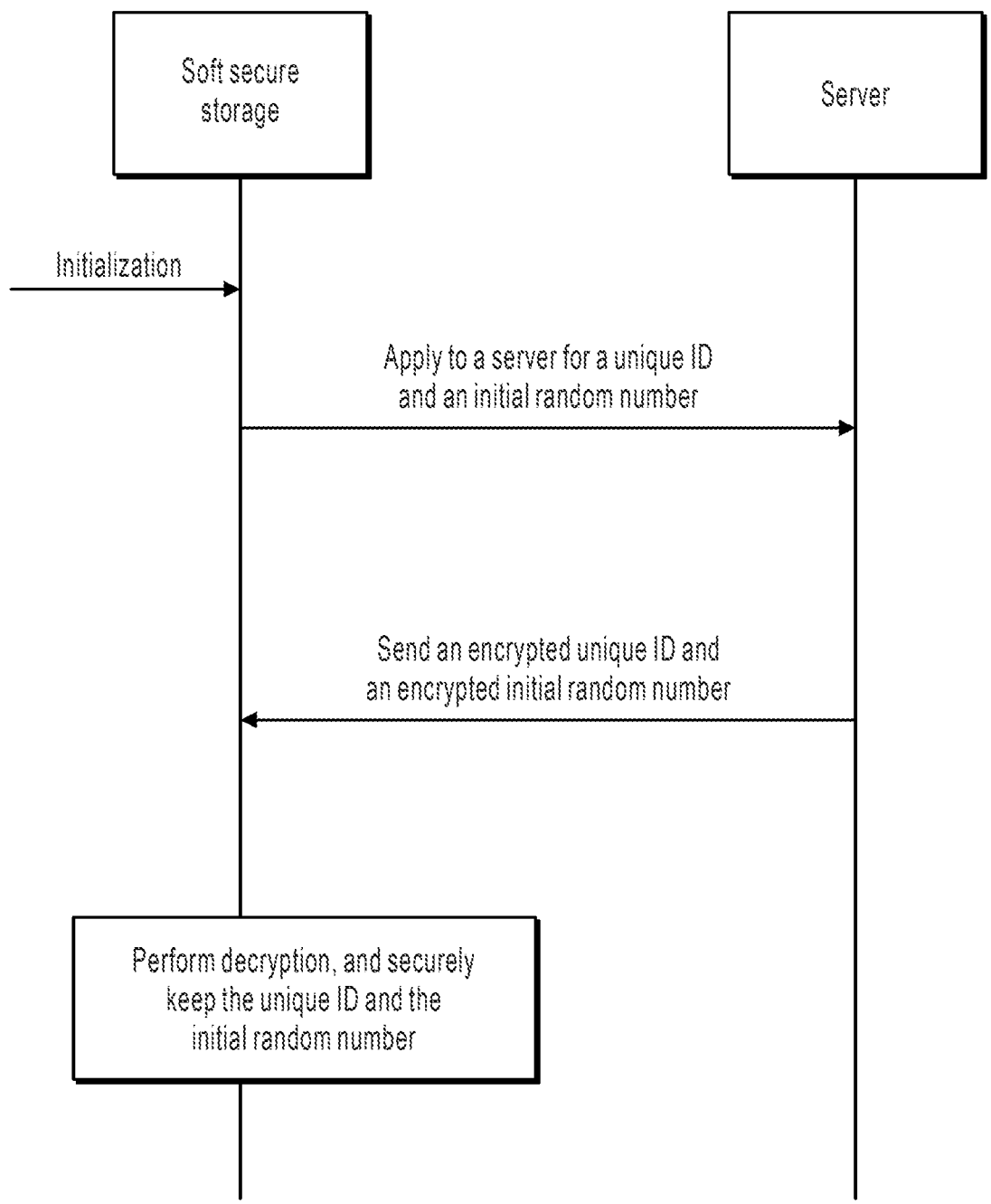
FIG. 2 is a schematic diagram illustrating an application scenario of initializing soft secure storage of a client, according to an implementation of the present application.

FIG. 2 is a schematic diagram illustrating an application scenario of initializing soft secure storage of a client, according to an implementation of the present application. In FIG. 2, when the soft secure storage of the client is initialized, the client applies to a secure service of the server for a unique ID and an initial random number. The server generates and encrypts the unique ID and the initial random number of the client, and then delivers an encrypted unique ID and an encrypted initial random number to the client. The client performs decryption and securely keeps the unique ID and the initial random number.

It is worthwhile to note that in an implementation scenario in which the service data in the present implementation includes the unique identifier and the variable identifier in the local secure storage of the client that are sent by the server to the client, information triggered by the client and including the service data, the unique identifier, the variable identifier, etc. is used as the entirety of the service data sent to the server. For example, some fields are added to the service data. The fields include the unique identifier and the variable identifier. Alternatively, in another application scenario, the service data, the unique identifier, and the variable identifier are used as separate data, and the three pieces of data are sent to the server together. Certainly, the service data can be a specific service operation, or can be message information such as an authentication request of the client. Therefore, it can be understood to some extent that the message sent by the client to the server includes the unique identifier and the variable identifier of the client. Implementations are not limited in the present application.

In the present implementation of the present application, when the service data is sent to the server by using a service related to the local secure storage of the client, the service data can include the unique identifier and the variable identifier in the local secure storage of the client that are sent by the server to the client.

S2. The server parses out the unique identifier and the variable identifier in the service data sent by the client, and determines, through comparison, whether the parsed-out unique identifier and variable identifier are the same as a unique identifier and a variable identifier that are recorded by the server for the client.

In the present implementation, after receiving the service data sent by the client, the server can parse the service data to obtain the unique identifier and the variable identifier in the service data uploaded by the client. Because the server pre-stores the unique identifier and the previous variable identifier that are allocated to the client, the server can determine, through comparison, whether the parsed-out unique identifier and variable identifier are the same as the unique identifier and the variable identifier that are recorded and stored on the server for the client. Certainly, as described above, if encryption processing is performed on the unique identifier and the variable identifier uploaded by the client, the server uses a decryption method corresponding to the encryption processing to perform decryption processing, and obtains the unique identifier and the variable identifier.

The server receives the service data sent by the client, obtains the unique identifier and the variable identifier of the client, and determines, through comparison, whether the parsed-out unique identifier and variable identifier are the same as the unique identifier and the variable identifier that are recorded by the server for the client.

S3. If a comparison result is no, the server determines that local secure storage of the client is under a copy attack, and performs a predetermined response action; or if a comparison result is yes, the server sends a new variable identifier to the client.

The server compares the parsed-out unique identifier and variable identifier with the unique identifier and the variable identifier that are recorded by the server for the client. If a comparison result is that at least one of the parsed-out unique identifier and variable identifier is different from the unique identifier and the variable identifier that are recorded by the server for the client, it can indicate that the client that sends the service data is abnormal. Particularly, if the variable identifiers, such as the random numbers in the present implementation, are different, it indicates that the corresponding soft secure storage applied in the client probably has been under a copy attack and the application has been run, thereby triggering a related service of the soft secure storage. Therefore, in the present implementation of the present application, if the server determines through comparison that the parsed-out unique identifier and variable identifier are different from the unique identifier and the variable identifier that are recorded by the server for the client, the server can determine that the local secure storage of the client is under a copy attack, and can further perform the predetermined response action. The response action can be predetermined based on an actual situation, for example, forced logout, prohibition on a financial operation of a user account, and encryption protection authentication.

Certainly, if the server determines through comparison that the parsed-out unique identifier and variable identifier are the same as the unique identifier and the variable identifier that are recorded by the server for the client, it can be considered that the client that sends a service request is an authentic client of the user. Service access can be allowed, and a further operation can be performed. Then, the server can generate a new variable identifier for the client, and then send the new variable identifier to the client. In the present implementation, if the server determines that the unique ID and the random number that are uploaded by the client are consistent with the unique ID and the previously sent random number that are recorded in the storage for the client, identity authentication of the client succeeds, and the server generates a new random number and sends the new random number to the client.

S4. The client updates the received new variable identifier in the local secure storage.

As described above, when the server determines that the unique identifier and the variable identifier uploaded by the client are the same as the unique identifier and the variable identifier that are recorded by the server for the client, the server can send the new variable identifier to the client, and the client can update the new variable identifier in the local secure storage of the client for use by service data to be sent for the next time.

The processing method for preventing a copy attack provided in the present application can be used to prevent an attacker from launching a copy attack on regular device binding. In addition, a remote server is further used for determining whether the local secure storage applied in the client is under a copy attack. In a real use environment, the attacker obtains device data, deploys an attacking environment, and launches an attack. These actions usually lag behind an action of reusing a terminal application by the user. In the implementations provided in the present application, time validity of stored data is set to ensure that information data stolen through a copy attack by the attacker easily expires. In addition, the server determines whether a copy attack is launched. Considering that data storage security and data computing security of the server usually have a higher priority than those of the client, it is difficult for the attacker to bypass authentication protection of the server. As such, difficulty in launching a copy attack can be increased, overall harm of implementing a copy attack can be reduced, security of data storage applied in a terminal device can be improved, a user property loss can be reduced, and user property security can be protected.

Certainly, as described above, if a comparison result is no, i.e., if the comparison result is that the server determines that at least one of the parsed-out unique identifier and variable identifier is different from the unique identifier and the variable identifier that are recorded by the server for the client, it can be considered that the local secure storage of the client is under a copy attack. Further, the response action can be performed. The response action in the present application can be set based on an actual situation, for example, forced logout, prohibition on a financial operation of a user account, and encryption protection authentication. When it is determined that the local secure storage of the client is under a copy attack, a processing method is provided based on the method in the present application. In another implementation of the processing method for preventing a copy attack in the present application, the predetermined response action can include the following step:

S301. The server delivers a message that identity authentication needs to be performed on a user corresponding to the service data, and after the identity authentication succeeds, sends a redistributed unique identifier and a redistributed variable identifier to the client of the user.

Correspondingly, the client of the user performs identity authentication based on the received identity authentication message, for example, password login, fingerprint login, and face login. After the user passes the identity authentication on the client of the user, the local secure storage can be initialized based on the received unique identifier and the received variable identifier that are redistributed by the server for the client of the user.

The variable identifier in the present application can use one or a combination of numerals, letters, or symbols. In an implementation of the variable identifier provided in the present application, time validity of the variable identifier (such as a random integer) can be implemented through integer accumulation. Therefore, in an implementation of the method in the present application, the variable identifier is set to be generated through successive integer accumulation.

In an application scenario, the variable identifier of the client C1 uses an initial random six-digit integer 013579. Each time a service of the secure storage triggers update of the variable identifier, an updated variable identifier is generated by adding 1 to the value of the previous variable identifier. For example, the initial variable identifier is 013579, a variable identifier generated and sent by the server to the client C1 for the next time is 013580, 013581 for next time, and so on. Certainly, the server can randomly generate different initial random six-digit integers for different clients.

The processing method for preventing a copy attack can be applied to a security authentication server. Time validity is set for data to ensure that data stolen through a copy attack by a hacker easily expires. In addition, the server determines whether the client is under a copy attack. Therefore, difficulty in launching a copy attack is increased, harm of implementing a copy attack is reduced, and security of data storage applied in the client is improved. Therefore, based on the implementations described above, the present application further provides a processing method for preventing a copy attack that can be applied to a server. The method can include:

S201. Receive service data sent by a client, where the service data includes a unique identifier and a variable identifier in local secure storage of the client that are sent by a server to the client.

S202. Parse the unique identifier and the variable identifier in the service data sent by the client, and determine, through comparison, whether the parsed-out unique identifier and variable identifier are the same as a recorded unique identifier and variable identifier of the client.

S203. If a comparison result is no, determine that the local secure storage of the client is under a copy attack, and perform a predetermined response action; or if a comparison result is yes, send a new variable identifier to the client.

Figure 3:
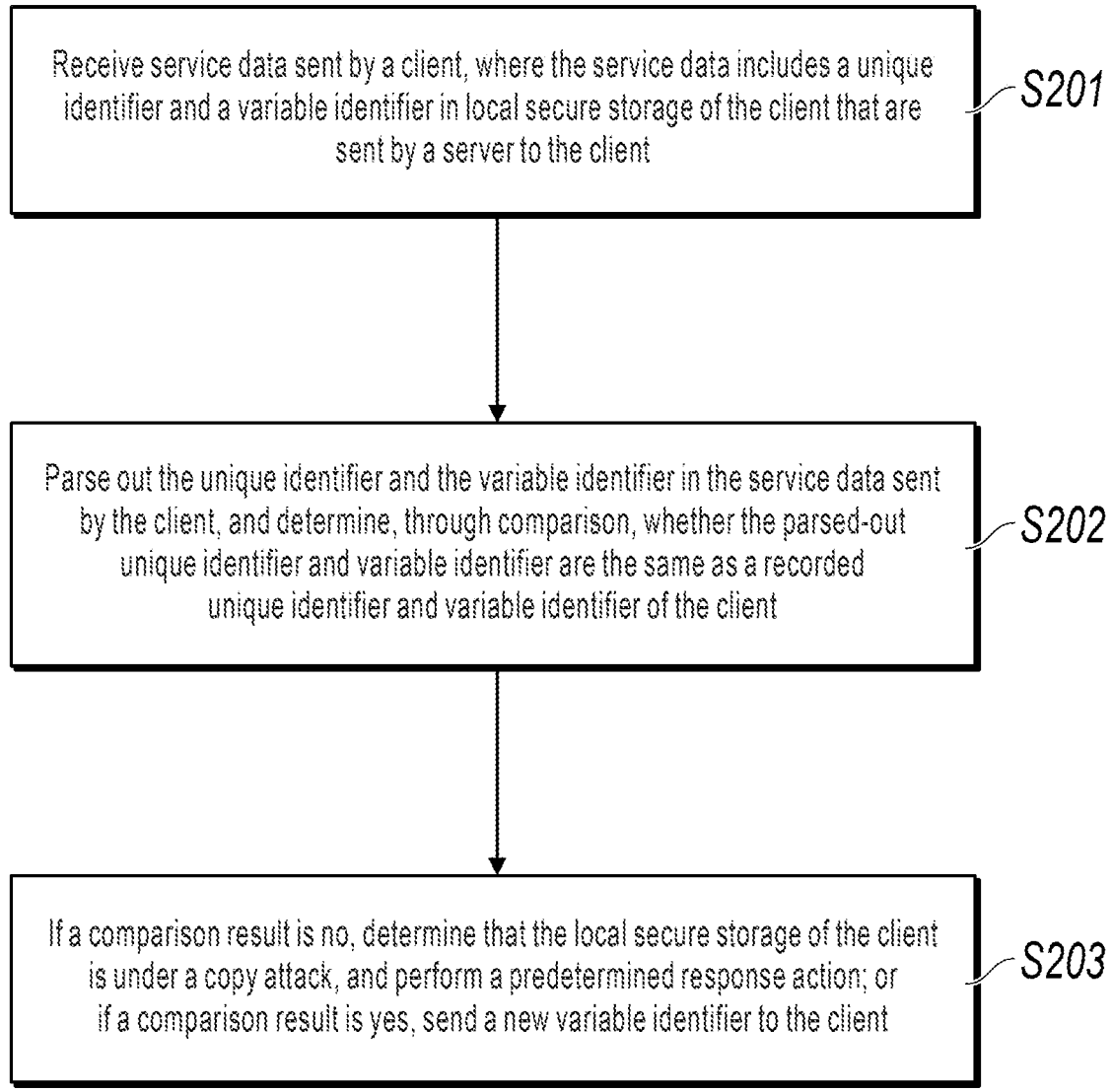
FIG. 3 is a method flowchart illustrating a processing method for preventing a copy attack, according to another implementation of the present application.

FIG. 3 is a method flowchart illustrating a processing method for preventing a copy attack, according to an implementation of the present application. In an application scenario, when a user uses a service related to soft secure storage, a client encrypts a unique ID and a random number in the soft secure storage, and sends encrypted unique ID and encrypted random number together with service data to a server. The server obtains the unique ID and the random number through decryption. If it is determined that the unique ID and the random number are consistent with a unique ID and a random number that are stored on the server, it indicates that the soft secure storage is not under a copy attack. The server updates a new random number for the soft secure storage, and the soft secure storage updates the local random number.

In another application scenario, if the server finds that the random number uploaded by the client is different from a random number recorded by the server, it may indicate that the soft secure storage has been under a copy attack and run.

In this case, the server can perform identity authentication on a user of an account and perform initialization. In another implementation of the method of the present application, when the server determines that the local secure storage of the client is under a copy attack, a predetermined response action can include: delivering a message that identity authentication needs to be performed on a user corresponding to the service data, and after the identity authentication succeeds, sending, to the client of the user, a redistributed unique identifier and a redistributed variable identifier.

The variable identifier can be set to be generated through successive integer accumulation. In addition, in another implementation, information exchange of the unique identifier and the variable identifier between the client and the server can be implemented by using any encryption method of asymmetric encryption or symmetric encryption. For details of methods for data setting, data generation, and data exchange, reference can be made to descriptions of other implementations of the present application. Details are omitted here for simplicity.

The present application provides a processing method for preventing a copy attack that can be applied to a server, so that the server determines whether the client is under a copy attack. A corresponding action is performed based on a determining result, to ensure as much as possible that user data stolen by a hacker easily expires. Therefore, security of data storage of the client is improved, and a processing method for preventing a copy attack and reducing a loss caused by a copy attack on a user is provided.

Currently, the processing method for preventing a copy attack in the present application is applicable to a client. Local secure storage of the client stores a unique identifier that is configured by a server for the client and a variable identifier that is updated each time a service operation is performed. When the client interacts with the server, the client sends the local identifier and the variable identifier to the server, and then performs a local operation based on the result of determining by the server, for example, account identity authentication, soft secure storage initialization, and random number updating. The present application provides the processing method for preventing a copy attack that can be applied to a client. The method can include the following steps:

S301. When local secure storage is initialized, store a unique identifier and a variable identifier that are sent by a server.

S302. Send service data to the server, where the service data includes the unique identifier and the variable identifier in the local secure storage.

S303. Receive a new variable identifier sent by the server, where the new variable identifier is a variable identifier sent by the server, when the server determines through comparison that the unique identifier and the variable identifier that are uploaded by the client are the same as a unique identifier and a variable identifier that are recorded by the server for the client.

S304. Update the received new variable identifier to the local secure storage.

Figure 4:
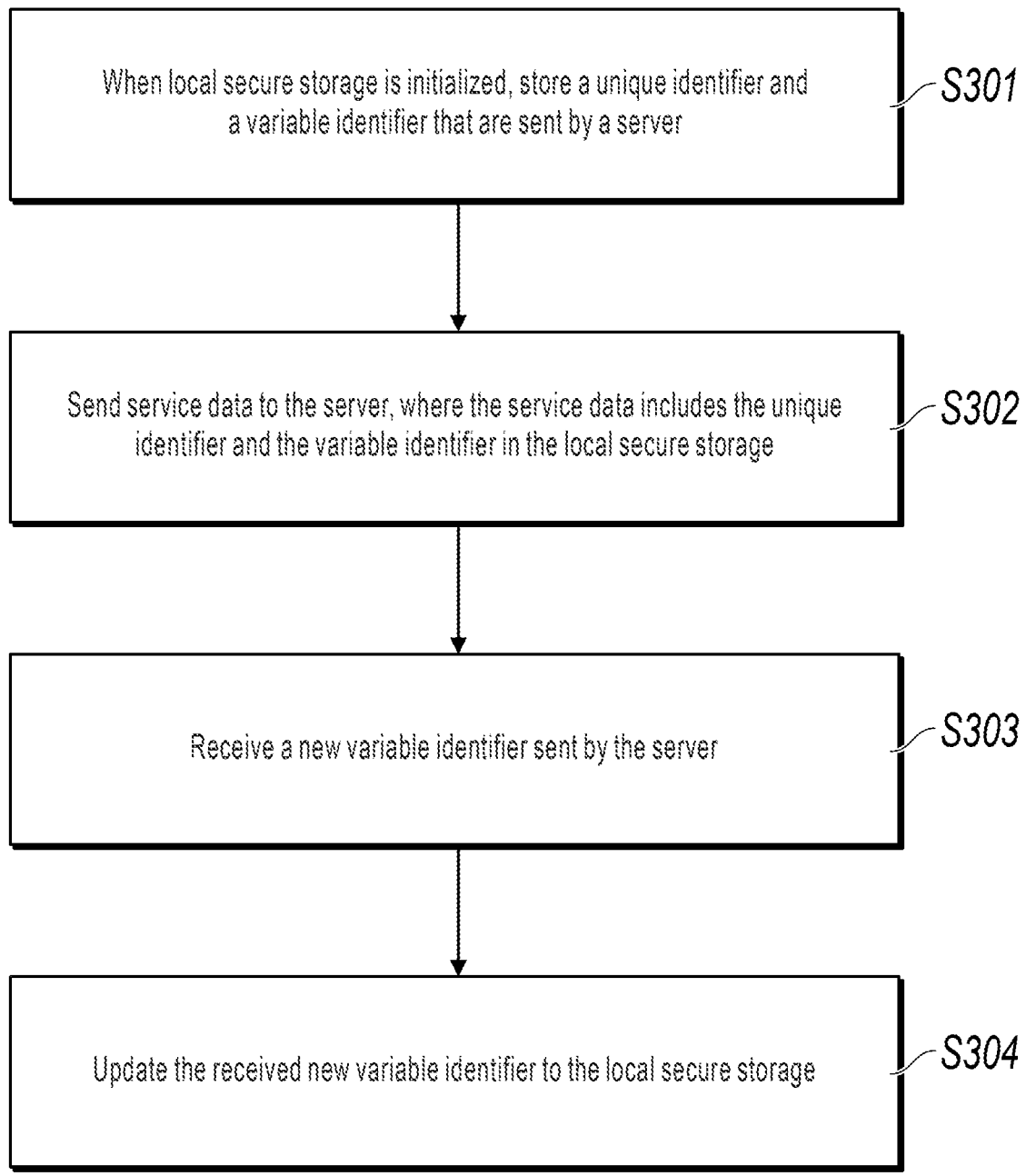
FIG. 4 is a method flowchart illustrating a processing method for preventing a copy attack, according to another implementation of the present application.

FIG. 4 is a method flowchart illustrating a processing method for preventing a copy attack, according to another implementation of the present application. Certainly, in another implementation, the processing method for preventing a copy attack that can be applied to a client can further include: performing identity authentication based on a received identity authentication message, and after the identity authentication succeeds, initializing the local secure storage based on a received unique identifier and variable identifier that are redistributed by the server.

The server, and the client, and the processing method performed between the server and the client for preventing a copy attack, provided in the implementations of the present application, can be used to prevent an attacker from launching a copy attack on conventional device binding. In addition, a remote server is further used for determining whether the local secure storage applied in the client is under a copy attack. In a real use environment, the attacker obtains device data, deploys an environment, and launches an attack. These actions usually lag behind an action of reusing a terminal application by the user. In the implementations provided in the present application, time validity of stored data is set to ensure that information data stolen through a copy attack by the attacker easily expires. In addition, the server determines whether a copy attack is launched. Considering that data storage security and data computing security of the server usually have a higher priority than those of the client, it is difficult for the attacker to bypass authentication protection of the server. As such, difficulty in launching a copy attack can be increased, overall harm of implementing a copy attack can be reduced, security of data storage applied in a terminal device can be improved, a user property loss can be reduced, and user property security can be protected.

Figure 5:
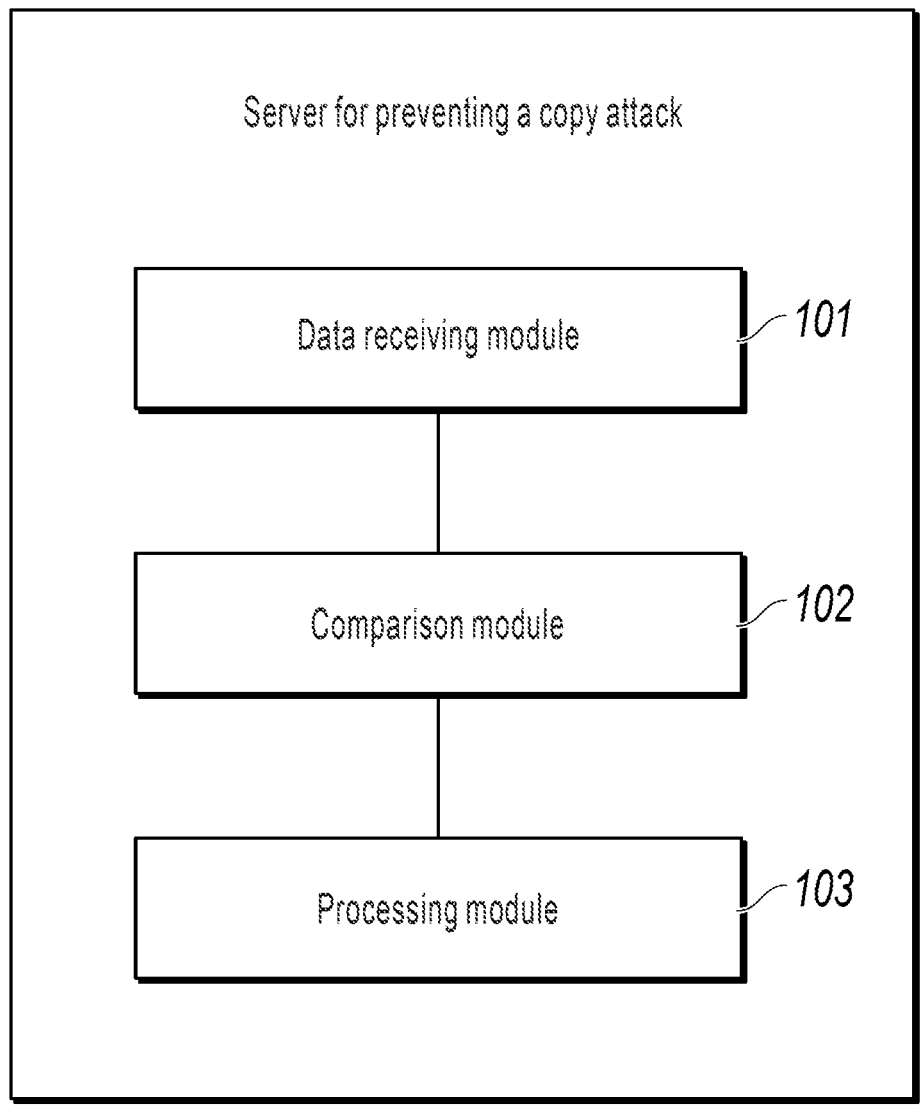
FIG. 5 is a schematic structural diagram illustrating modules of a server for preventing a copy attack, according to an implementation of the present application.

Based on the processing method for preventing a copy attack described in the previous implementations, the present application further provides a processing apparatus for preventing a copy attack. The apparatus can be applied in a server, and a system using a secure service. FIG. 5 is a schematic structural diagram illustrating modules of a server for preventing a copy attack, according to an implementation of the present application. As shown in FIG. 5, the server can include: a data receiving module 101, configured to receive service data sent by a client, where the service data includes a unique identifier and a variable identifier in local secure storage of the client that are sent by the server to the client; a comparison module 102, configured to parse out the unique identifier and the variable identifier in the service data sent by the client, and determine, through comparison, whether the parsed-out unique identifier and variable identifier are the same as a recorded unique identifier and variable identifier of the client; and a processing module 103, configured to determine that the local secure storage of the client is under a copy attack, and perform a predetermined response action if a comparison result of the comparison module 102 is no; or if a comparison result of the comparison module 102 is yes, send a new variable identifier to the client.

Figure 6:
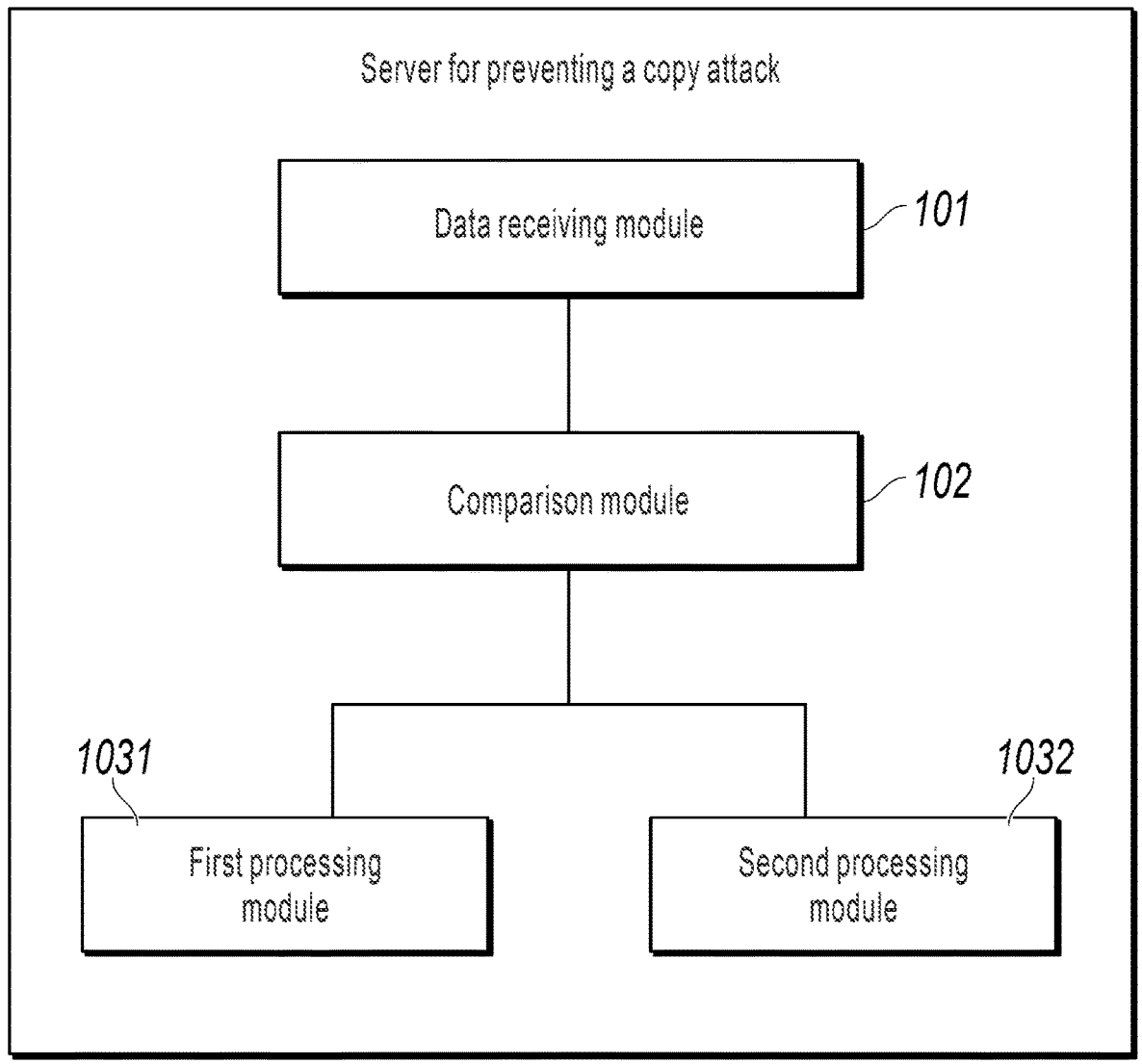
FIG. 6 is a schematic structural diagram illustrating modules of a server for preventing a copy attack, according to another implementation of the present application.

The predetermined response action can be set based on a specific application scenario. In an implementation provided in the present application, if it is determined that the local secure storage of the client is under a copy attack, identity authentication can be performed again on a user, and the local secure storage can be initialized. FIG. 6 is a schematic structural diagram illustrating modules of a processing server for preventing a copy attack, according to another implementation of the present application. As shown in FIG. 6, the processing module 103 can include: a first processing module 1031, configured to deliver a message that identity authentication needs to be performed on a user corresponding to the service data when it is determined that the local secure storage of the client is under a copy attack, and after the identity authentication succeeds, send, to the client of the user, a redistributed unique identifier and a redistributed variable identifier; and a second processing module 1032, configured to send, by the server, a new variable identifier to the client, when it is determined that the local secure storage of the client is not under a copy attack.

As described above, in another implementation of the apparatus in the present application, the variable identifier is set to be generated through successive integer accumulation. In addition, information exchange of the unique identifier and the variable identifier between the client and the server is implemented by using any encryption method of asymmetric encryption or symmetric encryption. For details, reference can be made to related descriptions in other implementations of the present application. Details are omitted here for simplicity.

The processing server for preventing a copy attack described above can determine whether the local secure storage applied in the client is under a copy attack. In a real use environment, the attacker obtains device data, deploys an environment, and launches an attack. These actions usually lag behind an action of reusing a terminal application by the user. In the implementations provided in the present application, time validity of stored data is set to ensure that information data stolen through a copy attack by the attacker easily expires. In addition, the server determines whether a copy attack is launched. Considering that data storage security and data computing security of the server usually have a higher priority than those of the client, it is difficult for the attacker to bypass authentication protection of the server. As such, difficulty in launching a copy attack can be increased, overall harm of implementing a copy attack can be reduced, security of data storage applied in a terminal device can be improved, a user property loss can be reduced, and user property security can be protected.

Figure 7:
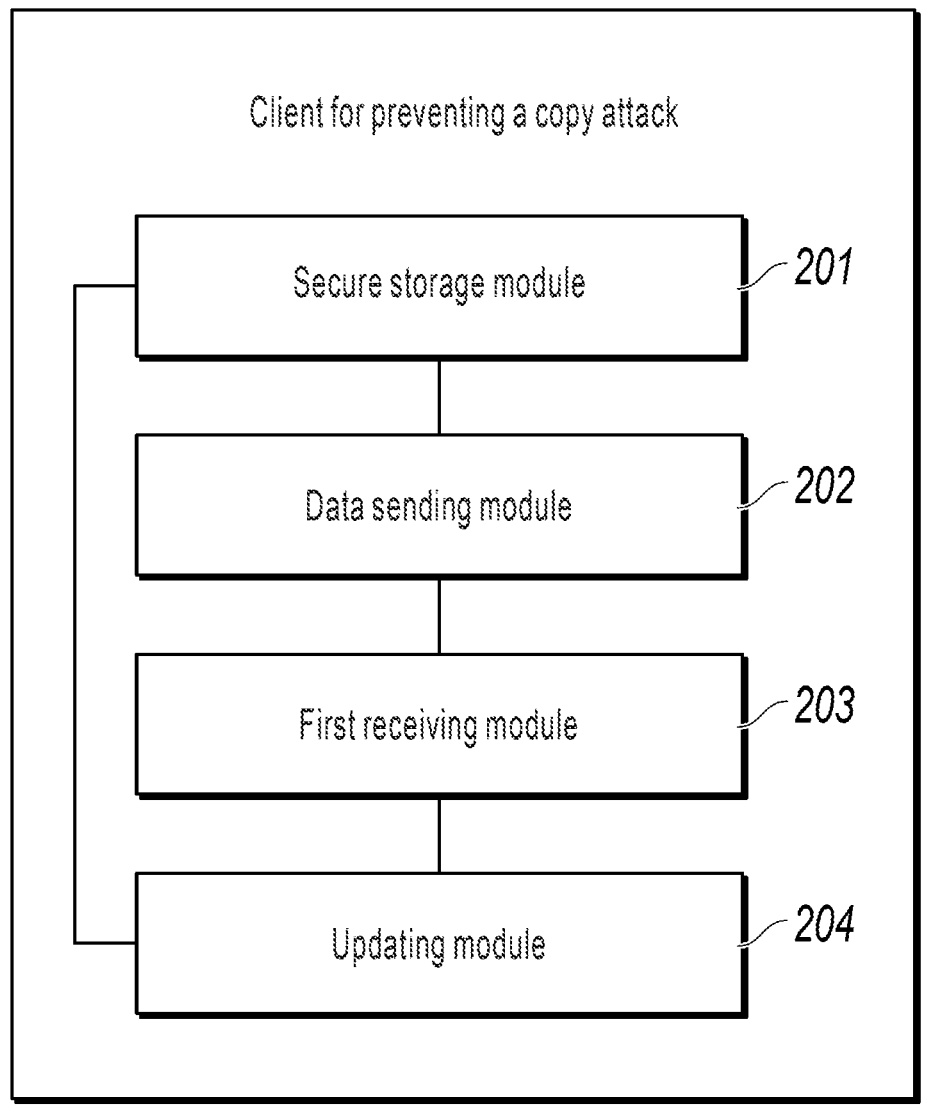
FIG. 7 is a schematic structural diagram illustrating modules of a client for preventing a copy attack, according to an implementation of the present application.

The present application further provides a client for preventing a copy attack. During information exchange with a server, whether local secure storage of a client is under a copy attack can be determined based on a unique identifier and a variable identifier that are allocated by the server. Methods such as changing a random number are applied to ensure that data stolen through a copy attack by an attacker easily expires. The server determines whether the client is under a copy attack. Therefore, data in the local secure storage of the client is effectively protected, data storage security is improved, and difficulty in launching a copy attack is increased. FIG. 7 is a schematic structural diagram illustrating modules of a client for preventing a copy attack, according to an implementation of the present application. As shown in FIG. 7, the client can include: a secure storage module 201, configured to store a unique identifier and a variable identifier that are sent by a server when local secure storage is initialized; a data sending module 202, configured to send service data to the server, where the service data includes the unique identifier and the variable identifier that are stored in the secure storage module 201; a first receiving module 203, configured to receive a new variable identifier sent by the server, where the new variable identifier is a variable identifier sent by the server when the server determines through comparison that the unique identifier and the variable identifier that are uploaded by the client are the same as a unique identifier and a variable identifier that are recorded by the server for the client; and an updating module 204, configured to update the received new variable identifier to the local secure storage.

Figure 8:
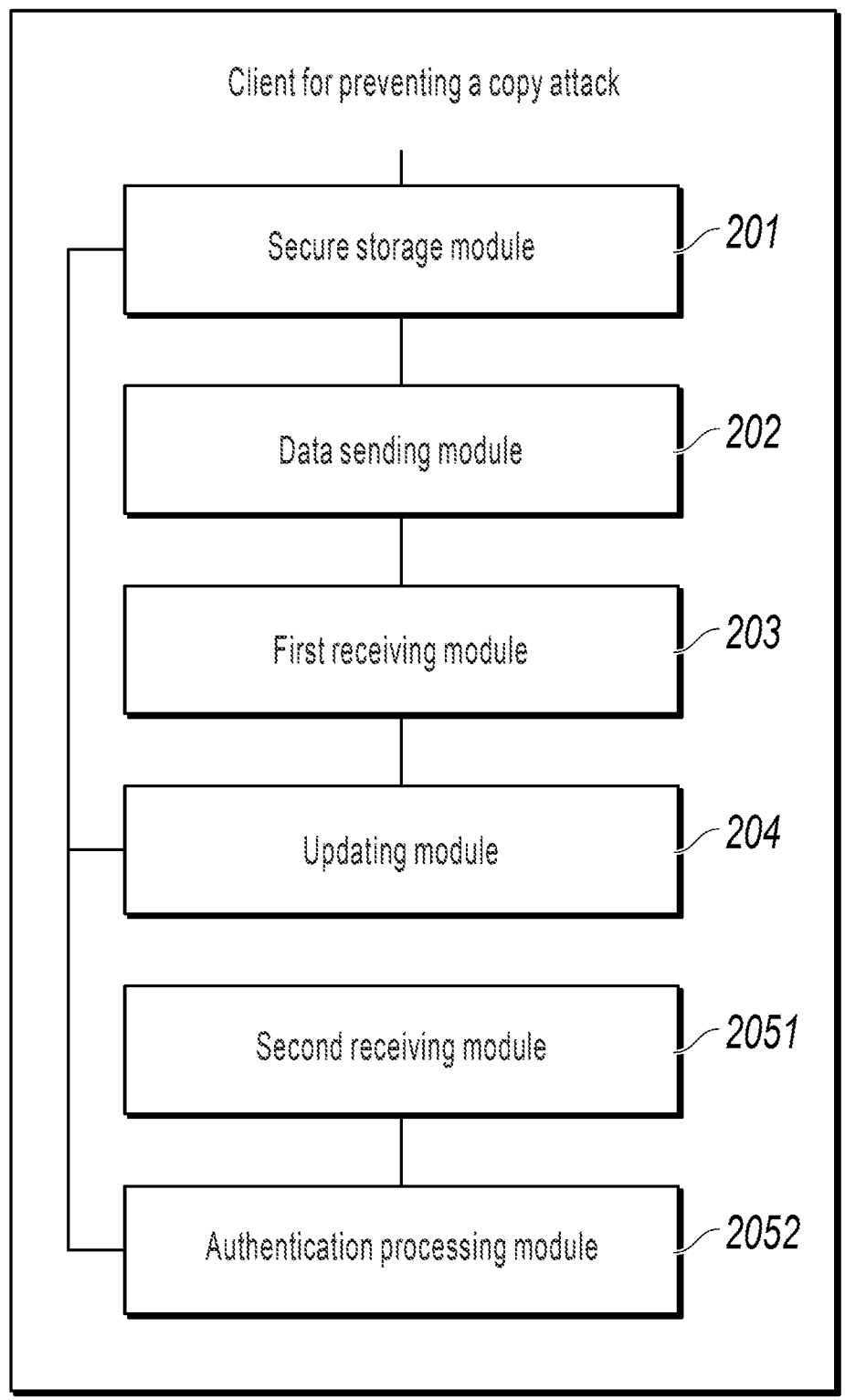
FIG. 8 is a schematic structural diagram illustrating modules of a client for preventing a copy attack, according to another implementation of the present application.

FIG. 8 is a schematic structural diagram illustrating modules of a client for preventing a copy attack, according to another implementation of the present application. As shown in FIG. 8, the client can further include: a second receiving module 2051, configured to receive an identity authentication message sent by the server, and receive a redistributed unique identifier and a redistributed variable identifier that are sent by the server after identity authentication succeeds; and an authentication processing module 2052, configured to perform identity authentication based on the received identity authentication message, and after the identity authentication succeeds, initialize the local secure storage based on the received unique identifier and the received variable identifier that are redistributed by the server.

The present application provides the client for preventing a copy attack. During information exchange with a server, whether local secure storage of a client is under a copy attack can be determined based on a unique identifier and a variable identifier that are allocated by the server. Methods such as changing a random number are applied to ensure that data stolen through a copy attack by an attacker easily expires. The server determines whether the client is under a copy attack. Therefore, data in the local secure storage of the client is effectively protected, data storage security is improved, and difficulty in launching a copy attack is increased.

The method, the server, or the client described in the previous implementations can implement secure storage in a trusted execution environment (TEE) with relatively good effects. Certainly, in another execution environment such as an ANDROID system environment, a language such as c/c++, a virtual machine technology, and a technology such as obfuscation can be used to implement secure storage, thereby improving security of soft secure storage.

The content of the present application includes descriptions of data storage, setting, and an information exchange method, such as local secure storage of data, a data format of a variable identifier, encryption/decryption processing, and information data sending/receiving. However, the present application is not limited to situations satisfying industry processing standards, specifications, or implementations. A slightly modified implementation based on some industry standards or implementations can also achieve expected implementation effects same as, equivalent to, or close to those achieved based on the previous implementations or variants of the previous implementations. Applying these modified or changed data storage, setting, an information exchange method, etc. can still fall within a protection scope of an optional implementation of the present application.

Although the present application provides method operation steps described in the implementations or flowcharts, more or fewer operation steps can be included based on conventional or non-creative means. The sequence of the steps listed in the implementations is merely one of numerous step execution sequences, and does not represent the unique execution sequence. For an actual apparatus or client product, the steps can be executed based on the method sequence illustrated in the implementations or accompanying drawings or executed in parallel (for example, an environment of parallel processors or multi-threaded processing).

The units, apparatuses, or modules described in the previous implementations can be implemented by a computer chip or an entity, or implemented by a product with a certain function. For ease of description, the previous apparatus is described by dividing the functions into various modules. Certainly, when the present application is implemented, the functions of the modules can be implemented by using the same or multiple pieces of software and/or hardware, or a module for implementing a function is implemented by using a combination of multiple submodules or subunits.

A person skilled in the art also knows that, in addition to implementing a controller by using a computer readable program code, logic programming can be performed on method steps to allow the controller to implement the same function in forms of a logic gate, a switch, an application-specific integrated circuit, a programmable logic controller, an embedded microcontroller, etc. Therefore, the controller can be considered as a hardware component, and an apparatus included in the controller and configured to implement various functions can also be considered as a structure in the hardware component. Alternatively, the apparatus configured to implement various functions can even be considered as both a software module implementing the method and a structure in the hardware component.

The present application can be described in the general context of computer executable instructions executed by a computer, for example, a program module. Generally, the program module includes a routine, a program, an object, a component, a data structure, a type, etc. that executes a specific task or implements a specific abstract data type. The present application can also be practiced in distributed computing environments. In the distributed computing environments, tasks are performed by remote processing devices connected through a communications network. In a distributed computing environment, the program module can be located in both local and remote computer storage media that including storage devices.

It can be seen from the descriptions of the implementations that a person skilled in the art can clearly understand that the present application can be implemented by using software and a necessary general hardware platform. Based on such an understanding, the technical solutions of the present application essentially or the part contributing to the existing technology can be implemented in a form of a software product. The software product can be stored in a storage medium such as a read-only memory (ROM)/random access memory (RAM), a magnetic disk, or an optical disc, and includes several instructions for instructing a computer device (which can be a personal computer, a mobile device, a server, a network device, etc.) to perform the methods described in the implementations or in some parts of the implementations of the present application.

The implementations in the present specification are described in a progressive manner. For the same or similar parts in the implementations, reference can be made to each other. Each implementation focuses on a difference from other implementations. The present application can be applied in many general-purpose or dedicated computer system environments or configurations, for example, a personal computer, a server computer, a handheld device or a portable device, a tablet device, a multi-processor system, a microprocessor-based system, a set top box, a programmable video playback system, a network PC, a small computer, a mainframe computer, and a distributed computing environment including any one of the previous systems or devices.

Although the present application is described by using the implementations, a person of ordinary skill in the art knows that many modifications and variations of the present application can be made without departing from the spirit of the present application. It is expected that the claims include these modifications and variations without departing from the spirit of the present application.

Figure 9:
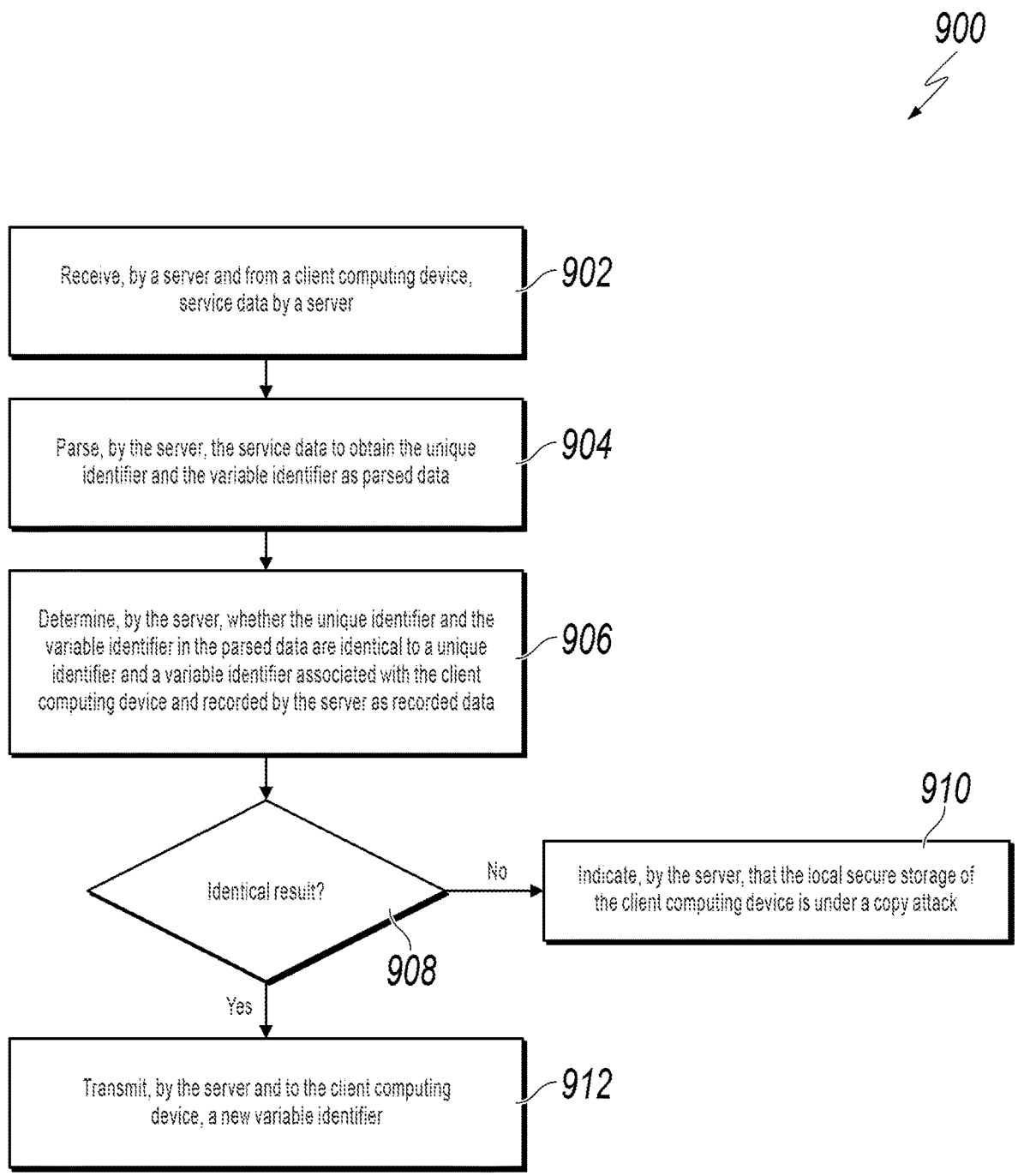
FIG. 9 is a flowchart illustrating an example of a computer-implemented method for preventing a copy attack, according to an implementation of the present disclosure.

FIG. 9 is a flowchart illustrating an example of a computer-implemented method 900 for preventing a copy attack, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, service data is received by a server and from a client computing device, where the service data includes a unique identifier and a variable identifier stored in a local secure storage of the client computing device. In some implementations, asymmetric encryption or symmetric encryption is used to exchange of the unique identifier and the variable identifier between the client computing device and the server. In some implementations, when the local secure storage of the client computing device is initialized, the client computing device stores as the service data, a unique identifier and a variable identifier that are transmitted by the server and received by the client computing device. The client computing device transmits the service data to the server. From 902, method 900 proceeds to 904.

At 904, the server parses the service data to obtain the unique identifier and the variable identifier as parsed data. From 904, method 900 proceeds to 906.

At 906, the server determines whether the unique identifier and the variable identifier in the parsed data are identical to a unique identifier and a variable identifier associated with the client computing device and recorded by the server as recorded data. From 906, method 900 proceeds to 908.

At 908, a determination is made as to whether the unique identifier and the variable identifier in the parsed data are identical to a unique identifier and a variable identifier associated with the client computing device and recorded by the server as recorded data. If the result of the determination is not identical, method 900 proceeds to 910. Otherwise, if the result of the determination is identical, method 900 proceeds to 912.

At 910, the server indicates that the local secure storage of the client computing device is under a copy attack, and performs a predetermined response action. In some implementations, the predetermined response action includes transmitting, by the server and to the client computing device, a message that an identity authentication needs to be performed by the client computing device with respect to a user corresponding to the service data. After the identity authentication succeeds, a redistributed unique identifier and a redistributed variable identifier are sent to a client computing device associated with the user. In some implementations, the client computing device performs an identity authentication based on a message, received from the server that an identity authentication needs to be performed by the client computing device with respect to a user corresponding to the service data. After the identity authentication succeeds, the client computing device initializes the local secure storage based on a redistributed unique identifier and a redistributed variable identifier transmitted to the client computing device by the server. After 910, method 900 can stop.

At 912, the server transmits a new variable identifier to the client computing device. In some implementations, variable identifiers are generated through successive integer accumulation. In some implementations, if the result of the determination is identical, the client computing device receives the new variable identifier transmitted by the server and the client computing device updates the local secure storage of the client computing device with the new variable identifier. After 912, method 900 can stop.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving, by a server and from a client computing device, service data, wherein the service data comprises a first unique identifier and a first variable identifier stored in a local secure storage of the client computing device;
   parsing, by the server, the service data to obtain the first unique identifier and the first variable identifier as parsed data;
   determining, by the server, whether the first unique identifier and the first variable identifier in the parsed data are respectively identical to a second unique identifier and a second variable identifier associated with the client computing device and recorded by the server as recorded data, wherein the second unique identifier is generated by the server and uniquely identifies the client computing device, wherein the second variable identifier is a random number updated by the server each time the client computing device is triggered to use a service related to the local secure storage; and
   in response to determining that either of the first unique identifier and the first variable identifier in the parsed data is not identical to the second unique identifier and the second variable identifier, respectively:
      indicating, by the server, that the local secure storage of the client computing device is under a copy attack, and
      performing a predetermined response action; or
   in response to determining that the first unique identifier and the first variable identifier in the parsed data are identical to the second unique identifier and the second variable identifier, respectively:
      transmitting, by the server and to the client computing device, a new variable identifier to replace the first variable identifier, wherein the new variable identifier is included within next service data received from the client computing device.

2. The computer-implemented method of claim 1, further comprising:
   in response to determining that the first unique identifier and the first variable identifier in the parsed data are identical to the second unique identifier and the second variable identifier, respectively:
      receiving, by the client computing device, the new variable identifier transmitted by the server; and
      updating, by the client computing device, the local secure storage of the client computing device with the new variable identifier.

3. The computer-implemented method of claim 1, wherein the predetermined response action comprises:
   transmitting, by the server and to the client computing device, a message that an identity authentication needs to be performed by the client computing device with respect to a user corresponding to the service data; and
   after the identity authentication succeeds:
      sending, to the client computing device, a redistributed unique identifier and a redistributed variable identifier.

4. The computer-implemented method of claim 1, wherein variable identifiers are generated through successive integer accumulation.

5. The computer-implemented method of claim 1, wherein the first unique identifier and the first variable identifier are transmitted to the client computing device that is not under the copy attack, wherein to exchange of the first unique identifier and the first variable identifier between the client computing device that is not under the copy attack and the server is encrypted by asymmetric encryption or symmetric encryption.

6. The computer-implemented method of claim 1, further comprising:
   when the local secure storage of the client computing device is initialized, storing, by the client computing device and as the service data, a unique identifier and a variable identifier that are transmitted by the server and received by the client computing device; and
   transmitting, by the client computing device, the service data to the server.

7. The computer-implemented method of claim 1, further comprising:
   performing, by the client computing device, an identity authentication based on a message, received from the server, that an identity authentication needs to be performed by the client computing device with respect to a user corresponding to the service data; and
   after the identity authentication succeeds:
      initializing, by the client computing device, the local secure storage based on a redistributed unique identifier and a redistributed variable identifier transmitted to the client computing device by the server.

8. A non-transitory, computer-readable medium storing one or more instructions executable by a computer system to perform operations comprising:
   receiving, by a server and from a client computing device, service data, wherein the service data comprises a first unique identifier and a first variable identifier stored in a local secure storage of the client computing device;
   parsing, by the server, the service data to obtain the first unique identifier and the first variable identifier as parsed data;
      determining, by the server, whether the first unique identifier and the first variable identifier in the parsed data are respectively identical to a second unique identifier and a second variable identifier associated with the client computing device and recorded by the server as recorded data, wherein the second unique identifier is generated by the server and uniquely identifies the client computing device, wherein the second variable identifier is a random number updated by the server each time the client computing device is triggered to use a service related to the local secure storage; and
   in response to determining that either of the first unique identifier and the first variable identifier in the parsed data is not identical to the second unique identifier and the second variable identifier, respectively:
indicating, by the server, that the local secure storage of the client computing device is under a copy attack, and
performing a predetermined response action; or
in response to determining that the first unique identifier and the first variable identifier in the parsed data are identical to the second unique identifier and the second variable identifier, respectively:
transmitting, by the server and to the client computing device, a new variable identifier to replace the first variable identifier, wherein the new variable identifier is included within next service data received from the client computing device.

9. The non-transitory, computer-readable medium of claim 8, further comprising:
in response to determining that the first unique identifier and the first variable identifier in the parsed data are identical to the second unique identifier and the second variable identifier, respectively:
receiving, by the client computing device, the new variable identifier transmitted by the server; and
updating, by the client computing device, the local secure storage of the client computing device with the new variable identifier.

10. The non-transitory, computer-readable medium of claim 8, wherein the predetermined response action comprises:
transmitting, by the server and to the client computing device, a message that an identity authentication needs to be performed by the client computing device with respect to a user corresponding to the service data; and
after the identity authentication succeeds:
sending, to the client computing device, a redistributed unique identifier and a redistributed variable identifier.

11. The non-transitory, computer-readable medium of claim 8, wherein variable identifiers are generated through successive integer accumulation.

12. The non-transitory, computer-readable medium of claim 8, wherein the first unique identifier and the first variable identifier are transmitted to the client computing device that is not under the copy attack, wherein exchange of the first unique identifier and the first variable identifier between the client computing device that is not under the copy attack and the server is encrypted by asymmetric encryption or symmetric encryption.

13. The non-transitory, computer-readable medium of claim 8, further comprising:
when the local secure storage of the client computing device is initialized, storing, by the client computing device and as the service data, a unique identifier and a variable identifier that are transmitted by the server and received by the client computing device; and
transmitting, by the client computing device, the service data to the server.

14. The non-transitory, computer-readable medium of claim 8, further comprising:
performing, by the client computing device, an identity authentication based on a message, received from the server, that an identity authentication needs to be performed by the client computing device with respect to a user corresponding to the service data; and
after the identity authentication succeeds:
initializing, by the client computing device, the local secure storage based on a redistributed unique identifier and a redistributed variable identifier transmitted to the client computing device by the server.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a server and from a client computing device, service data, wherein the service data comprises a first unique identifier and a first variable identifier stored in a local secure storage of the client computing device;
parsing, by the server, the service data to obtain the first unique identifier and the first variable identifier as parsed data;
determining, by the server, whether the first unique identifier and the first variable identifier in the parsed data are respectively identical to a second unique identifier and a second variable identifier associated with the client computing device and recorded by the server as recorded data, wherein the second unique identifier is generated by the server and uniquely identifies the client computing device, wherein the second variable identifier is a random number updated by the server each time the client computing device is triggered to use a service related to the local secure storage; and
in response to determining that either of the first unique identifier and the first variable identifier in the parsed data is not identical to the second unique identifier and the second variable identifier, respectively:
indicating, by the server, that the local secure storage of the client computing device is under a copy attack, and
performing a predetermined response action; or
in response to determining that the first unique identifier and the first variable identifier in the parsed data are identical to the second unique identifier and the second variable identifier, respectively:
transmitting, by the server and to the client computing device, a new variable identifier to replace the first variable identifier, wherein the new variable identifier is included within next service data received from the client computing device.

16. The computer-implemented system of claim 15, further comprising:
in response to determining that the first unique identifier and the first variable identifier in the parsed data are identical to the second unique identifier and the second variable identifier, respectively:
receiving, by the client computing device, the new variable identifier transmitted by the server; and
updating, by the client computing device, the local secure storage of the client computing device with the new variable identifier.

17. The computer-implemented system of claim 15, wherein the predetermined response action comprises:
transmitting, by the server and to the client computing device, a message that an identity authentication needs to be performed by the client computing device with respect to a user corresponding to the service data; and
after the identity authentication succeeds:

sending, to the client computing device, a redistributed unique identifier and a redistributed variable identifier.

18. The computer-implemented system of claim 15, wherein variable identifiers are generated through successive integer accumulation, and wherein the first unique identifier and the first variable identifier are transmitted to the client computing device that is not under the copy attack, wherein exchange of the first unique identifier and the first variable identifier between the client computing device that is not under the copy attack and the server is encrypted by asymmetric encryption or symmetric encryption.

19. The computer-implemented system of claim 15, further comprising:
when the local secure storage of the client computing device is initialized, storing, by the client computing device and as the service data, a unique identifier and a variable identifier that are transmitted by the server and received by the client computing device; and
transmitting, by the client computing device, the service data to the server.

20. The computer-implemented system of claim 15, further comprising:
performing, by the client computing device, an identity authentication based on a message, received from the server, that an identity authentication needs to be performed by the client computing device with respect to a user corresponding to the service data; and
after the identity authentication succeeds:
initializing, by the client computing device, the local secure storage based on a redistributed unique identifier and a redistributed variable identifier transmitted to the client computing device by the server.

* * * * *

UNITED STATES PATENT AND TRADEMARK OFFICE
CERTIFICATE OF CORRECTION

| | |
|---|---|
| PATENT NO. | : 10,887,343 B2 |
| APPLICATION NO. | : 16/722832 |
| DATED | : January 5, 2021 |
| INVENTOR(S) | : Xiaofeng Li |

It is certified that error appears in the above-identified patent and that said Letters Patent is hereby corrected as shown below:

In the Claims

Column 18/Line 18, In Claim 5, before "exchange" delete "to".

Signed and Sealed this
Twenty-sixth Day of April, 2022

Katherine Kelly Vidal
Director of the United States Patent and Trademark Office